United States Patent Office 3,446,731
Patented May 27, 1969

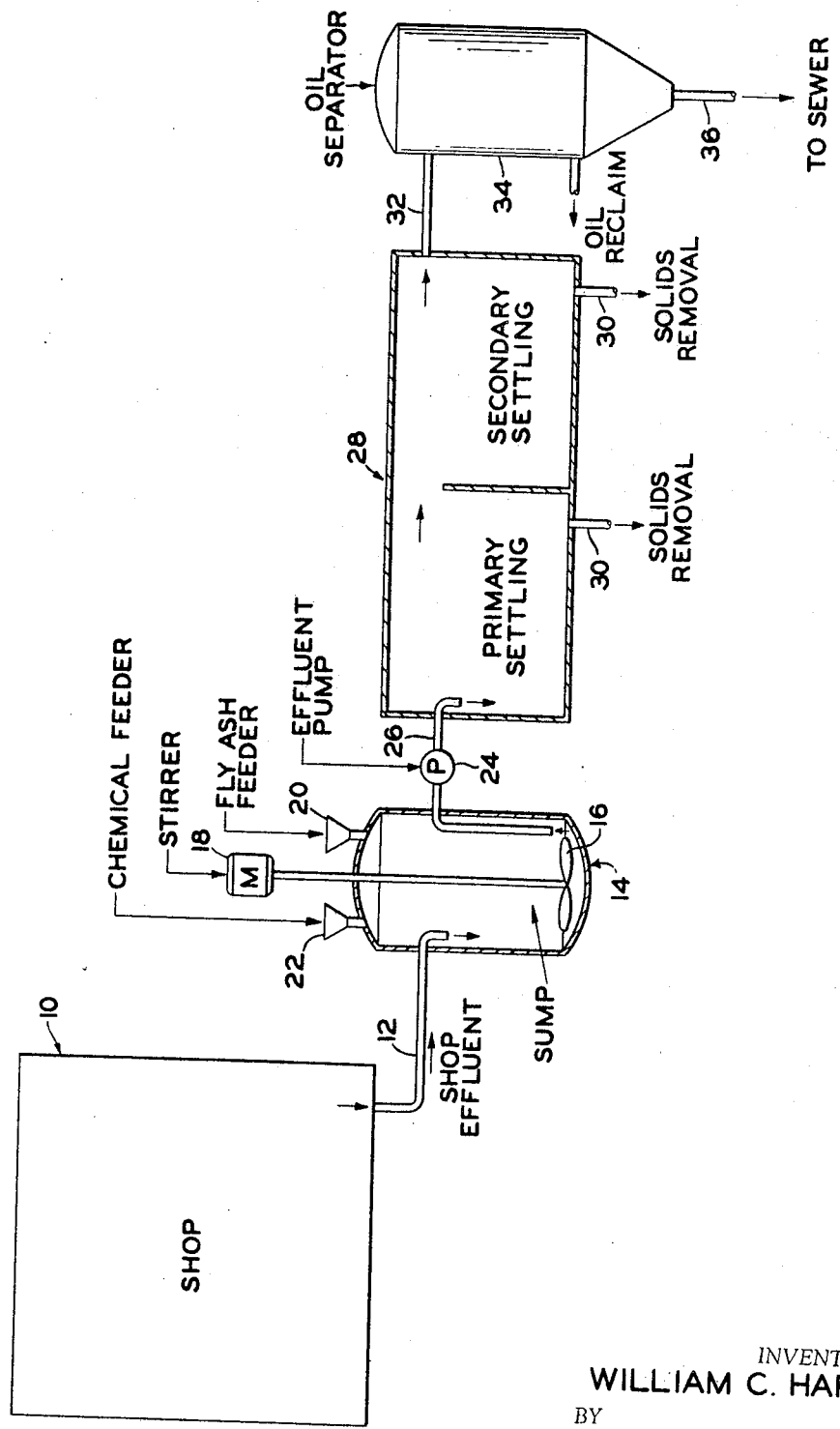

3,446,731
COAGULANT AND PROCESS FOR TREATING WASTE WATERS
William C. Harsh, Cleveland Heights, Ohio, assignor to Cleveland Technical Center, Inc., Cleveland, Ohio, a corporation of Delaware
Filed Apr. 24, 1967, Ser. No. 633,216
Int. Cl. B01d 21/01
U.S. Cl. 210—43
8 Claims

ABSTRACT OF THE DISCLOSURE

Fly ash in combination with alum and/or ferric chloride, functions unexpectedly as a coagulant for aqueous wastes containing immiscible liquid materials and suspended particulate solids.

A process for removing oily residues and suspended solids from waste waters wherein fly ash in combination with alum and/or ferric chloride is admixed with the waste waters, followed by phase separation, and removal of non-aqueous phases.

This invention relates to the treatment of waste waters; and more particularly, to the treatment of waste waters containing suspended solids.

The problem

Stream pollution has arisen to alarming levels in the last two decades as the result of increasing population, increasing density of manufacturing companies to supply the population with goods, and concomitantly decreasing water supplies. The situation has been brought about further by more slowly tightening public laws relating to anti-stream and public water polution. Polllution comes about in various ways, but one substantial amount comes about as the result of dumping industrial waste waters into streams and lakes.

Some of the aqueous effluents are rather simple to treat by filtration and settling processes, to remove relatively innocuous solid materials, such as sand, and the like. Also, some of the liquids, containing acids, can merely be neutralized and then filtered to remove solids before returning to natural waters.

However, substantial difficulty arises in the treatment of aqueous wastes which contain immiscible liquids, such as oils, solvents, detergents and the like from manufacturing shops. These are particularly difficult to handle because they contain suspended solids that do not separate out. The rather small content of immiscible liquids, or oil-containing residues generally serve to coat the fine particles and keep them suspended so effectively that ordinary coagulants and settling procedures do not function at all.

For example, cutting oils used in metal machining plants effectively suspend fine powdered materials such as dust, dirt, fine particles of metals and oxides, and the like in any aqueous medium in which they are placed. It is well known, of course, that these cutting oils wear out and eventually find their way into the sewer water. Also, coolants for grinding machines contain emulsifiers for the oil content and these readily suspend the ground off metal particles, metal oxides, particles of grinding stone materials such as silicon carbide, aluminum oxide and the like. These will also effectively suspend rouge particles used for polishing operations in glass factories and the like.

The result is that these small particles become so effectively suspended by the oily phase of the waste water that ordinary coagulants and treating procedures for the suspended particles are rendered entirely ineffective.

The problem is further complicated by the fact that the oily content is mixed with the water phase so thoroughly that settling processes are ineffective to bring the oil to the top for skimming and removal. Thus, attempts at skimming are ineffective.

Therefore, a substantial step forward in the art would be provided by a coagulant for finely divided materials in aqueous media containing residues of immiscible liquids, and by a process of use.

Accordingly, an object of the present invention is to provide a novel coagulant for finely divided materials suspended in aqueous media.

A further object is to provide a process for treating aqueous wastes containing suspended particles, and optionally containing residues of immiscible liquids.

These and other objects and advantages of the invention will become apparent from the following description and appended claims, reference being had to the accompanying drawing forming a part of this specification, wherein The single figure is a representation of the process of the present invention, showing schematically apparatus and equipment for carrying out the process.

The coagulant

In accordance with one aspect of the present invention it has been found that fly ash in combination with alum and/or ferric chloride is an unexpectedly active coagulant for particulate materials suspended in an aqueous medium, which medium also includes immiscible liquids, such as oil residues.

The unexpected aspect of the invention is that fly ash per se has some coagulating effect, but the effect is weak, and relatively slow to be of any reasonable benefit in a commercial treating operation. Fly ash contains iron and aluminum hydroxides which would have some coagulating tendencies but these tendencies are so small that by themselves they are considered inconsequential. However, when fly ash is used in combination with alum and/or ferric chloride, the amount of the latter can be reduced, but their same coagulating effect is retained. Thus, fly ash per se does not perform any substantial coagulating function, but when admixed with alum and/or ferric chloride, the coagulating effect is substantially intensified, much more than would be expected from the addition of the actually used amount of alum or ferric chloride. There is an unexpected increase in coagulating power. In other words, there is a definite synergistic effect. The exact manner or mechanism by which this phenomenon is brought about is not known at the present time.

The foregoing synergistic combination has been found to be an unexpectedly good coagulant for oily industrial water wastes. More specifically, the immiscible liquids may include petroleum oils, hydrocarbon solvents such as gasoline, kerosene, naptha, diesel oil, fuel oil, aromatic solvents, detergents, such as the alkyl aromatic sulfonate family, cleaning materials, cutting oils, emulsifying agent-containing coolants for grinding machines, and the like. These are generally classed as oily residues of derivatives because they are normally subjected to high temperatures during use. For example, the temperature of a metal cutting tool may approach 200–400° F. This causes gradual degradation of the normal molecular structure of the material so that residues or changed forms, at least to a substantial extent, appear in the waste waters in which they occur.

The suspended solids may be inorganic or organic in nature and may include such materials as dust, metal oxides, powdered meal fragments, carbon particles, powdered abrasives such as silicon carbide and aluminum oxide, and other finely divided particulate materials.

As defined herein, fly ash is the finely divided residue that results from the combustion of ground or powdered coal and is transported from the boiler by the flue gases. Within the broad scope of the invention, fly ash produced as by the combustion of all coals, and from any furnace using coal as a fuel can be considered effective.

The following analysis for fly ash is to be considered illustrative, and not limiting on the invention.

| Ingredient: | Percent by wt. |
| --- | --- |
| Carbon, C | 9–28 |
| Silica, $SiO_2$ | 7–27 |
| Alumina, $Al_2O_3$ | 17–25 |
| Iron oxide, $Fe_2O_3$ | 12–17 |
| Calcium oxide, CaO | .8–2 |
| Magnesium oxide, MgO | .4–8 |
| Titanium dioxide, $TiO_2$ | .6–1.2 |
| Loss on ignition | 9–28 |
| Particle size: | |
| Retained on 100 mesh sieve | 3–20 |
| Passing 100 mesh, retained on 200 mesh sieve | 4–14 |
| Passing 200 mesh, retaintd on 325 mesh sieve | 5–42 |
| Passing 325 mesh sieve | 48–82 |

The pH of fly ash, per se, in water is close to neutral, i.e., between about pH 6 and pH 8.

It may be stated by way of distinction that coal fly ash is different from cement kiln flue dust, which would have a substantial proportion of cement constituents, and be high on the lime side. Further, flue dust from the stack of a blast furnace or steel making furnace usually contains substantial proportions of iron ore particles and lime particles. Probably, the iron particles would settle so rapidly in aqueous media, as to provide little benefit in acting as a coagulant, whereas the lime particles could undesirably affect the pH of the waste effluent being treated.

Further, fly ash, as encompassed within the scope of the invention, does not include the ash residue recovered from the combustion of hydrocarbon fuels such as derived from petroleum oils. Instead, the fly ash used herein is derived from a carbonaceous fuel of the coal family. In contrast, the ashes from petroleum derived fuels are essentially carbon residues and do not function unexpectedly as does fly ash produced by the combustion of coal, which fly ash usually is low in carbon and high in refractory silicates, alumina and the alkaline earth metal oxides.

The amount of combined coagulant, i.e., fly ash in combination with alum and/or ferric chloride, employed in accordance with the invention will depend to a large degree upon the residual oily content of the aqueous phase, after initial separation of non-emulsified oils by skimming, and the weight content of suspended solid materials. Broadly, the amount of fly ash employed will be in the range from about 1% to about 20% by weight of the solids content of the effluent, calculated on a dry basis; a narrower and more preferred range would be from about 5% to about 10% of fly ash based on the dry weight of the solids. The use of alum and/or ferric chloride in general may be generally equivalent to the amount of fly ash employed, although this is general and not limiting. Experimental results, based on a specific effluent, will provide optimum operation within the scope of the invention.

The process

The process of the present invention is clearly illustrated on the drawing, which uses schematic representations of apparatus for performing the invention. It will be evident to the skilled artisan that a broad range of apparatus to accomplish the steps represented can be employed.

In accordance with the broad scope of the invention, the pH of the effluent is adjacent to a broad range between about pH 5.5 and about pH 9.5, and preferably to a narrower range of about pH 6.5 and about pH 8.5, depending on governmental requirements, either state or Federal, which govern the pH of the effluent that is discharged to Public waters. In any event, the pH of the effluent before treatment is taken. Fly ash is then added in the indicated amount, found desirable from actual experience, and then the pH is adjusted by use of alum and/or ferric chloride, to give the desired pH.

While no exact theory is known for the operation of the invention, it has been found that the combination coagulants of the invention unexpectedly function to break the emulsion and in doing so break the oily coating that surrounds and suspends each particle of solid material in the waste water. Additionally, the fly ask appears to produce a coagulating function due to its fine particulate nature and to its probable absorbing capacity for organic solids. The fly ash particles are very small in size. It postulated that the fly ash particles and perhaps associated positive or negative charges may act as nuclei around which the materials from the effluent coagulate, and enhance precipitation and settling. The fly ash also contains organic materials, which contain carbon, which may act as an absorbent for at least some of the chemical compounds in the effluents.

The process of the invention, as illustrated, broadly comprises the following steps:

(1) Providing a waste water effluent, as for example an effluent from an industrial machine shop.

(2) Running the aqueous effluent into a mixing zone and there adding, with agitation, a selected proportion of fly ash. After thorough admixture of the fly ash, alum and/or ferric chloride is added to provide a desired pH.

(3) After thorough mixing, conveying the effluent to a queiescent zone of at least one state where settling is effected. Here, the particulate materials settle to the bottom and are removed. Also, the oil materials float to the top for subsequent removal.

(4) The effluent is then relatively free of solids and is conveyed to an oil separation zone. In the oil separation zone, the immiscible, non-aqueous phase is removed.

(5) The clarified, oil-free water is then further conditioned as by pH adjustment and antibacterial treatment as necessary, for discharge to public waters.

In the light of the foregoing brief description of the process of the invention, a full description of each step and the coordination of the steps will now be described.

Step 1.—Providing a waste effluent. By reference to the drawing, note that shop sewer effluent, made up largely of water from a shop 10 is designated. This may represent a railroad repair machine shop, a metal working factory, a tool room grinding establishment or other. In such a shop 10, substantial quantities of water are usually used in various processing. Particularly, water is used as a coolant in grinding operations, and in cutting fluids. It is also used for soap showers, hand washing, cleaning and the like. The water thus picks up any oily residue phase, termed herein a normally immiscible liquid phase. However, agitation causes the normally immiscible contaminants such as saponified grease, emulsifiers, cutting oils and the like to become at least partially emulsified in the aqueous phase. This produces a suspension of particulate materials such as dust, metal cuttings, and the like rendering separation extremely difficult. Normally shop effluents contain both organic and inorganic particulate materials.

Step 2.—According to this step, the effluent in toto is conveyed via line 12 to a mixing chamber 14. A stirrer 16, actuated by a motor 18, is provided in the mixing chamber 14. At the mixing chamber 14 fly ash is added by means of a dry chemical feeder 20 at a prescribed ratio, as indicated above. After thorough admixture of the fly ash, alum and/or ferric chloride is added to provide a desired pH.

An effluent pump 24 and line 26 convey the stirred effluent to the next step.

Step 3.—After thorough mixing, the treated effluent is allowed to settle in a settling apparatus 28. This may comprise one or more stages as required by the volume per unit of time being treated. In such settling stage, a solids removal conduit 30 is provided so that the heavier sludge which accumulates on the bottom of the settling chamber can be removed for appropriate disposition.

Step 4.—During the settling operation, the oily phase is broken away from the aqueous phase and rises to the top so that it can be skimmed off. Therefore, from the settling zone 28, the effluent, still containing the oily phase, but having been converted to an immiscible state, is conveyed via a line 32 to an oil separator 34. Here, the immiscible phase, including oils, detergent residues and other materials that float are removed by skimming, by centrifuging or other.

Step 5.—The clarified and oil-free effluent is then ready for discharge via a sewer line 36 to public waters. Depending upon the bacteria content, acid content or other, anti-bacterial treatment and/or pH adjustment may be affected at this time, just prior to the final discharge.

Extended scope of the invention

The previous description has been directed to the unexpected result obtained by using fly ash in combination with alum and/or ferric chloride as a coagulant for particulate materials suspended in an aqueous waste containing some immiscible liquid phase in the nature of oil residues such as hydrocarbons, detergents, solvents and the like. No limitation has been placed on the particulate materials as to being inorganic or organic, however. Thus the broad scope of the invention in this particular environment would include solid materials of all kinds. It is believed that fly ash may function to absorb organic solids, and may react with in organic solids in some manner.

In addition to the foregoing aspect, the broad scope of the invention would encompass the treatment of aqueous waste, broadly, including either inorganic or organic solids and further without an immiscible liquid phase.

In addition to the usual advantages of water purification, the invention provides an advantage in that it utilizes a difficultly disposable waste material, fly ash, for a useful purpose. Fly ash is recovered from flue gases, of course, by conventional dust-removal equipment. Actually the invention advantageously uses an undesired polluting material, fly ash, to remove an undesired polluting material from water.

It is not known that any other finely divided materials than alum and/or ferric chloride would provide the same result with fly ash in a similar process.

I claim:

1. A process for treating aqueous wastes containing as pollutants both suspended particulate solids and a water-immiscible liquid emulsified with the water, comprising contacting such wastes with substantially only a mixture consisting essentially of fly ash and a coagulant selected from the group consisting of alum, ferric chloride, and mixtures thereof, coagulating the particulate solids and removing them from the aqueous wastes as sludge, breaking such emulsion to form substantially distinct immiscible and aqueous phases, and then separating such phases.

2. The process of claim 1 wherein said fly ash and coagulant are present in substantially equal amounts.

3. The process of claim 1 wherein an amount of the coagulant is used to adjust the pH of the aqueous wastes to a desired value prior to effecting such treatment.

4. The process of claim 1 wherein an amount of the coagulant is used to adjust the pH of the aqueous wastes to a value within he range of about 6.5 to about 8.5 prior to effecting such treatment.

5. The process of claim 1 wherein the fly ash is added in an amount in the range from about 1% to about 20%, by weight, based on the suspended solids, calculated on a dry basis.

6. The process of claim 1 wherein the fly ash is the finely divided residue that results from the combustion of ground coal and is transported from the combustion zone by effluent gases of combustion.

7. The process of claim 1 wherein the fly ash has an analysis within the range:

| Ingredient: | Percent by wt. |
|---|---|
| Carbon, C | 9–28 |
| Silica, $SiO_2$ | 7–27 |
| Alumina, $Al_2O_3$ | 17–25 |
| Iron oxide, $Fe_2O_3$ | 12–17 |
| Calcium oxide, CaO | .8–2 |
| Magnesium oxide, MgO | .4–8 |
| Titanium dioxide, $TiO_2$ | .6–1.2 |

8. The process of claim 7 wherein the fly ash is added in an amount in the range from about 1% to about 20%, by weight, based on the suspended solids, calculated on a dry weight basis.

References Cited

UNITED STATES PATENTS

| 2,217,143 | 10/1940 | Stevenson | 210—53 X |
| 3,301,779 | 1/1967 | Kovacs | 210—53 X |
| 3,226,319 | 12/1965 | Schick | 210—53 X |
| 3,297,568 | 1/1967 | McMahon | 210—53 X |
| 3,338,828 | 8/1967 | Clark | 210—53 X |

FOREIGN PATENTS 514,877  2/1937  Great Britain.

REUBEN FRIEDMAN, *Primary Examiner.*

JOHN ADEE, *Assistant Examiner.*

U.S. Cl. X.R.

210—53, 73